United States Patent
Ori

(10) Patent No.: US 6,570,696 B2
(45) Date of Patent: May 27, 2003

(54) OPTICAL SYSTEM FOR SCANNING AND OPTICAL SCANNING APPARATUS

(75) Inventor: Tetsuya Ori, Saitama (JP)

(73) Assignee: Fuji Photo Optical Co., Ltd., Omiya (JP)

(*) Notice: Subject to any disclaimer, the term of this patent is extended or adjusted under 35 U.S.C. 154(b) by 20 days.

(21) Appl. No.: 09/974,381

(22) Filed: Oct. 10, 2001

(65) Prior Publication Data
US 2002/0063940 A1 May 30, 2002

(30) Foreign Application Priority Data
Oct. 11, 2000 (JP) ........................................ 2000-310343

(51) Int. Cl.[7] .............................................. G02B 26/08
(52) U.S. Cl. ........................ 359/207; 359/208; 359/216; 347/256
(58) Field of Search .................... 359/197, 205, 359/206, 207, 208, 212, 216, 217, 218; 347/256, 258, 259, 260, 261

(56) References Cited

U.S. PATENT DOCUMENTS 6,266,174 B1 * 7/2001 Aoki ........................... 359/204
6,504,639 B1 * 1/2003 Yoshikawa et al. ......... 359/208

FOREIGN PATENT DOCUMENTS

| JP | 58-132719 | 8/1983 |
| JP | 04-21164 | 4/1992 |
| JP | 06-230307 | 8/1994 |
| JP | 08-278464 | 10/1996 |

* cited by examiner

Primary Examiner—Mark A. Robinson
(74) Attorney, Agent, or Firm—Frommer Lawrence & Haug LLP; Matthew K. Ryan

(57) ABSTRACT

An optical system and optical scanning apparatus can form a minute beam spot and big size images. The optical scanning apparatus deflects a beam with a polygon mirror, and focuses the beam on a target surface through a fθ-lens, a cylindrical lens, and a cylindrical mirror. The scanning stroke on the target surface is longer than 500 mm, and the incident angle in the sub-scan direction of the incident light into the cylindrical mirror is 15 degrees or less. The ratio of the beam size DX in the sub-scan direction of the incident light into the cylindrical mirror to the distance DL between the cylindrical mirror and the target surface satisfies $0.03 < DX/DL < 0.06$.

6 Claims, 7 Drawing Sheets

FIG. 3A

| SI (SURFACE NUMBER) | RI (CURVATURE RADIUS IN THE MAIN-SCAN DIRECTION) | DI (FACE-TO-FACE DISTANCE) | NDI (REFRACTIVE INDEX) |
|---|---|---|---|
| 1 | | | |
| 2 (CYLINDRICAL SURFACE) | | 5.500 | 1.513469 |
| 3 | | 627.200 | |
| 4 | | 60.592 | |
| 5 | −133.8030 | 29.890 | 1.793151 |
| 6 | −2494.2140 | 5.410 | |
| 7 | −408.4379 | 17.560 | 1.798178 |
| 8 | −200.0167 | 1.840 | |
| 9 | 3742.1067 | 26.520 | 1.798178 |
| 10 | −227.6618 | 12.000 | |
| 11 (CYLINDRICAL SURFACE) | | 10.000 | 1.513469 |
| 12 | | 492.036 | |
| 13 (CYLINDRICAL SURFACE) | | 239.691 | |
| 14 | | | |

FIG. 3B

| SI (SURFACE NUMBER) | RI (CURVATURE RADIUS IN THE SUB-SCAN DIRECTION) |
|---|---|
| 2 | 325.50 |
| 11 | −185.26 |
| 13 | −350.30 |

FIG. 3C

| F | 600 |
|---|---|
| $\phi M$ | 29.4 |
| $\phi A$ | 8.4 |
| W | 610 |
| DX/DL | 0.038 |
| F/DY | 20.4 |
| F1/F | −0.299 |
| F2/F | 0.789 |
| F3/F | 0.449 |

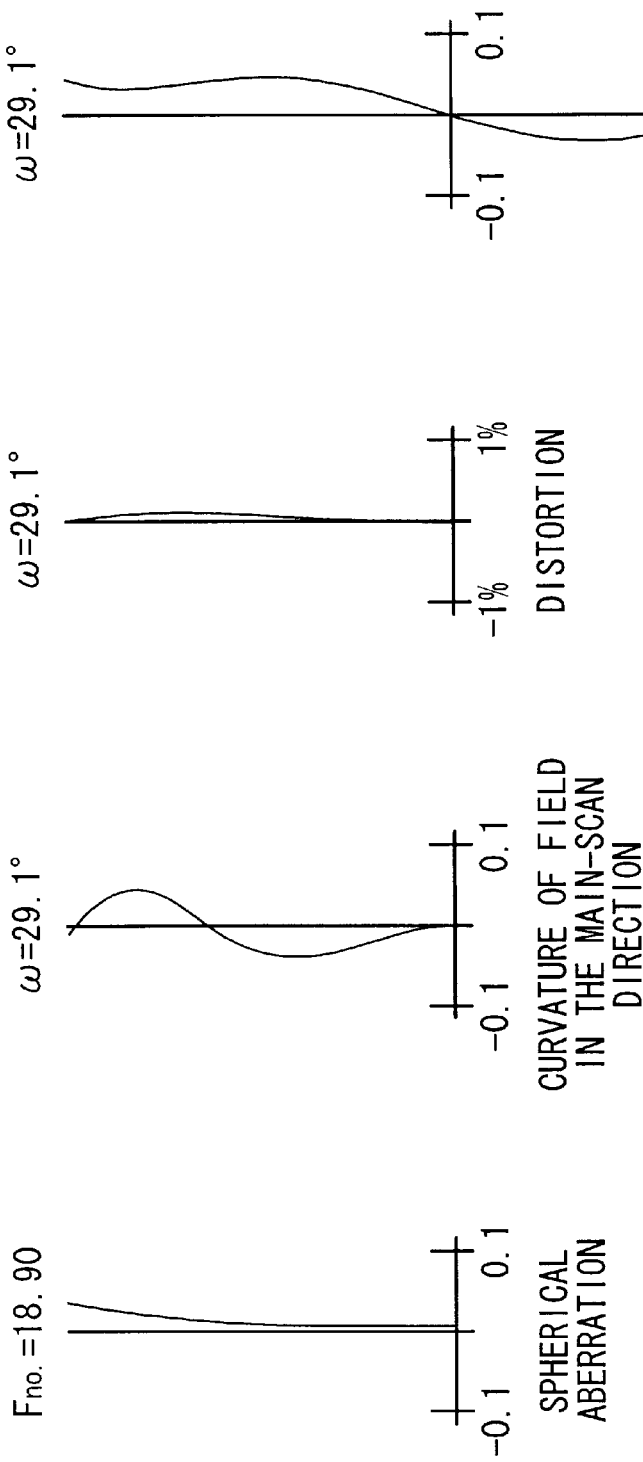

FIG. 6A

| SI (SURFACE NUMBER) | RI (CURVATURE RADIUS IN THE MAIN-SCAN DIRECTION) | DI (FACE-TO-FACE DISTANCE) | NDI (REFRACTIVE INDEX) |
|---|---|---|---|
| 1 | | | |
| 2 (CYLINDRICAL SURFACE) | | 5.500 | 1.513469 |
| 3 | | 627.200 | |
| 4 | | 60.592 | |
| 5 | -132.8400 | 18.860 | 1.793151 |
| 6 | -1818.1000 | 3.924 | |
| 7 | -422.8900 | 27.630 | 1.793151 |
| 8 | -189.7600 | 1.000 | |
| 9 | 2718.5000 | 34.020 | 1.707612 |
| 10 | -227.6700 | 11.563 | |
| 11 (CYLINDRICAL SURFACE) | | 10.000 | 1.513469 |
| 12 | | 490.309 | |
| 13 (CYLINDRICAL SURFACE) | | 239.807 | |
| 14 | | | |

FIG. 6B

| SI (SURFACE NUMBER) | RI (CURVATURE RADIUS IN THE SUB-SCAN DIRECTION) |
|---|---|
| 2 | 325.50 |
| 11 | -186.47 |
| 13 | -350.30 |

FIG. 6C

| F | 600 |
|---|---|
| $\phi M$ | 29.4 |
| $\phi A$ | 8.4 |
| W | 610 |
| DX／DL | 0.038 |
| F／DY | 20.4 |
| F1／F | -0.303 |
| F2／F | 0.687 |
| F3／F | 0.497 |

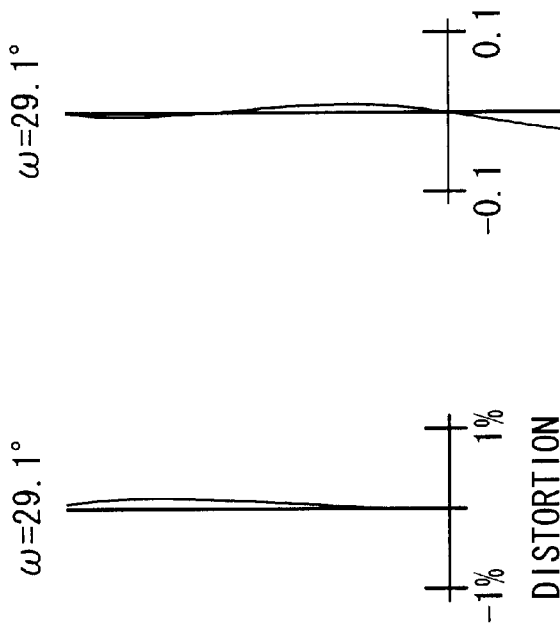
FIG. 7A SPHERICAL ABERRATION
FIG. 7B CURVATURE OF FIELD IN THE MAIN-SCAN DIRECTION
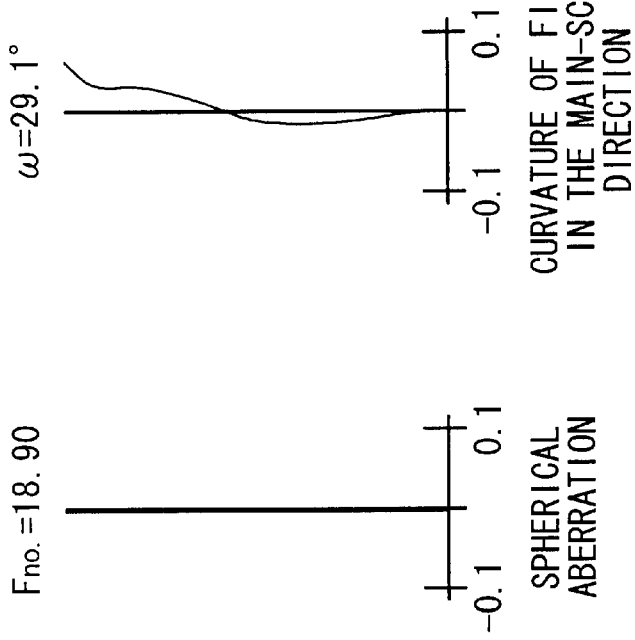
FIG. 7C DISTORTION
FIG. 7D CURVATURE OF FIELD IN THE SUB-SCAN DIRECTION

OPTICAL SYSTEM FOR SCANNING AND OPTICAL SCANNING APPARATUS

BACKGROUND OF THE INVENTION

1. Field of the Invention

This invention relates to an optical system and an optical scanning apparatus having the optical system used for devices such as laser beam printers.

2. Description of the Related Art

Many rotary polygons are used for optical systems of devices such as laser beam printers in order to deflect a laser beam at a high speed. The beam deflected by the rotary polygon forms a beam spot on a target surface (for example, a surface of a photo conductor drum) and the beam spot travels in the fixed direction with the rotation of the rotary polygon to form a scanning line.

When a tilt error or a field tilt due to a manufacturing error or an installation error exists in a reflective surface of the rotary polygon, the location of the beam spot on the target surface will shift and unevenness will arise between the scanning lines. In order to prevent the unevenness, a field tilt correcting optical system is typically applied to make a substantial conjugate relation between the reflective surface of the rotary polygon and the target surface. For example, Japanese Patent Laid-open No. 6-230307 discloses locating a cylindrical lens between the rotary polygon and the target surface. Japanese Patent Laid-open Nos. 58-132719 and 8-278464 disclose locating a toroidal lens between the rotary polygon and the target surface.

However, the longer the distance between the cylindrical lens and the target surface is, the larger the curvature of field in a sub-scan direction becomes, in using only a cylindrical lens as a field tilt correcting optical system. Therefore, the cylindrical lens should be located near the target surface. Moreover, the cylindrical lens should be manufactured to have longer length, which increases the manufacturing cost of the optical system, because the cylindrical lens requires a high processing cost. Especially, as high resolution is required, the tolerance of the curvature of field becomes smaller and the problem becomes more remarkable. Moreover, in using the toroidal lens as a field tilt correcting optical system, there is a problem that the manufacturing cost further increases as the scanning stroke becomes longer, that is, a longer toroidal lens is needed, because the toroidal lens itself requires a high processing cost.

Especially, in recent years, about 600 mm scanning stroke has been needed for devices such as laser beam printers, in order to form big size images (for example, A1 size). Furthermore, the resolution of about 600 dpi has been required for improvement in image quality. Thus, as the scanning stroke becomes longer and the resolution becomes higher, the problem of the manufacturing cost becomes more remarkable in both field tilt correcting optical systems described above.

Then, Japanese Patent Publication No. 4-21164 discloses a field tilt correcting optical system using a cylindrical lens and a cylindrical mirror. In the field tilt correcting optical system, the cylindrical lens is positioned to the side near the rotary polygon, and the cylindrical mirror is positioned to the side near the target surface. Such an arrangement allows a comparatively longer cylindrical mirror and a comparatively shorter cylindrical lens. The processing cost of cylindrical mirrors is cheap compared with cylindrical lenses, and such configuration contributes to reduction of the manufacturing cost of the optical system.

However, in such a field tilt correcting optical system, since a coma aberration occurs due to the reflection of the beam on the cylindrical mirror, a spot with the secondary intensity called a side lobe is formed adjoining the original beam spot on the target surface. Such a side lobe prevents diameter reduction of the beam spot and it is difficult to improve the resolution of images, which is a problem.

SUMMARY OF THE INVENTION

The present invention has been achieved in view of the above problems. It is an object of the invention to provide an optical system for scanning to form a minute beam spot and also to be applicable to the formation of big size images.

The present invention provides an optical system for scanning a predetermined target surface in a first scanning direction, comprising: a light source emitting a beam; a first image forming optical system for focusing the beam emitted from the light source in a direction perpendicular to a direction corresponding to the first scanning direction, thereby forming an image; deflecting means for deflecting a beam come out from the first image forming optical system so that the beam scans the target surface in the first scanning direction; a second image forming optical system for focusing the beam deflected by the deflecting means on the target surface and thereby forming an image so that a scanning speed on the target surface is uniform all over a scanning stroke; a cylindrical lens, located in an optical path between the second image forming optical system and the target surface, having negative refractive power only in a second scanning direction perpendicular to the first scanning direction; and a cylindrical mirror, located in an optical path between the cylindrical lens and the target surface, having refractive power only in the second scanning direction; wherein the scanning stroke in the first scanning direction on the target surface is longer than 500 mm; an incident angle of a paraxial beam passing through the second image forming optical system and entering the cylindrical mirror is 15 degrees or less in the second scanning direction; and a condition shown in expression (1) as follows is satisfied:

$$0.03 < DX/DL < 0.06 \tag{1}$$

in the expression, DX is a beam size in the second scanning direction of the beam entering the cylindrical mirror and DL is a distance between the cylindrical mirror and the target surface.

In the optical system for scanning of the invention, the generation of the coma aberration in the second scanning direction can be suppressed, and therefore the generation of the side lobe on the target surface can also be suppressed because the incident angle of the beam entering the cylindrical mirror is 15 degrees or less in the second scanning direction. In addition, the formation of big size images may be achieved because the scanning stroke in the first scanning direction is longer than 500 mm. It should be noticed that the size in the second scanning direction of the beam spot formed on the target surface becomes smaller, as the beam size DX in the second scanning direction of the incident light into the cylindrical mirror is greater. And the required length of the cylindrical mirror becomes shorter, as the distance DL between the cylindrical mirror and the target surface is longer. In addition, with the optical system for scanning of the invention, since expression (1) is satisfied, the sufficient minute beam spot to obtain the expected resolution in the second scanning direction can be acquired, and the length of the cylindrical mirror can be shorter to an extent that manufacturing can be performed without difficulty.

The present invention provides an optical system for scanning a predetermined target surface in a first scanning direction, comprising: a light source emitting a beam; a first image forming optical system for focusing the beam emitted from the light source in a direction perpendicular to a direction corresponding to the first scanning direction, thereby forming an image; deflecting means for deflecting a beam come out from the first image forming optical system so that the beam scans the target surface in the first scanning direction; a second image forming optical system for focusing the beam deflected by the deflecting means on the target surface and thereby forming an image so that a scanning speed on the target surface is uniform all over a scanning stroke; a cylindrical lens, located in an optical path between the second image forming optical system and the target surface, having negative refractive power only in a second scanning direction perpendicular to the first scanning direction; a cylindrical mirror, located in an optical path between the cylindrical lens and the target surface, having refractive power only in the second scanning direction; wherein the second image forming optical system comprises a first lens component having negative refractive power in the first scanning direction, a second lens component having positive refractive power in the first scanning direction, and a third lens component having positive refractive power in the first scanning direction in order from a side close to the deflecting means, and conditions shown in expressions (2) to (5) as follows are satisfied.

$$F/DY<25 \quad (2)$$

$$0.2<-F_1/F<0.35 \quad (3)$$

$$0.6<F_2/F<0.9 \quad (4)$$

$$0.3<F_3/F<0.7 \quad (5)$$

in the expressions, F is a focal length of the second image forming optical system;

DY is a beam size in the first scanning direction of the beam entering to the second image forming optical system;

$F_1$ is a focal length of the first lens component;

$F_2$ is a focal length of the second lens component; and $F_3$ is a focal length of the third lens component.

In the optical system for scanning of the invention, the size in the first scanning direction of the beam spot formed on the target surface can become shorter because the expression (2) is satisfied. Moreover, since the expressions (3)-(5) are satisfied, generation of spherical aberrations and coma aberrations can be prevented, and the curvature of field and distortion aberration in the first scanning direction are corrected properly.

Other and further objects, features and advantages of the invention will appear more fully from the following description.

BRIEF DESCRIPTION OF THE DRAWINGS

FIGS. 3A to 3C are tables of concrete data of example 1 of the optical system according to the embodiment of the invention.

FIG. 4A is a diagram showing the spherical aberration of the optical system of example 1 shown in FIG. 2.

FIG. 4B is a diagram showing the curvature of field in the main-scan direction of the optical system of example 1 shown in FIG. 2.

FIG. 4C is a diagram showing the distortion aberration of the optical system of example 1 shown in FIG. 2.

FIG. 4D is a diagram showing the curvature of field in the sub-scan direction of the optical system of example 1 shown in FIG. 2.

FIGS. 6A to 6C show concrete data of example 2 of the optical system according to the embodiment of the invention.

FIG. 7A is a diagram showing the spherical aberration of the optical system of example 2 shown in FIGS. 6A to 6C.

FIG. 7B is a diagram showing the curvature of field in the main-scan direction of the optical system of example 2 shown in FIGS. 6A to 6C.

FIG. 7C is a diagram showing the distortion aberration of the optical system of example 2 shown in FIGS. 6A to 6C.

FIG. 7D is a diagram showing the curvature of field in the sub-scan direction of the optical system of example 2 shown in FIGS. 6A to 6C.

DETAILED DESCRIPTION OF THE PREFERRED EMBODIMENTS

Embodiments of the present invention will be described in detail below with reference to accompanying drawings.

<Structure of an Optical System>

Figure 1:
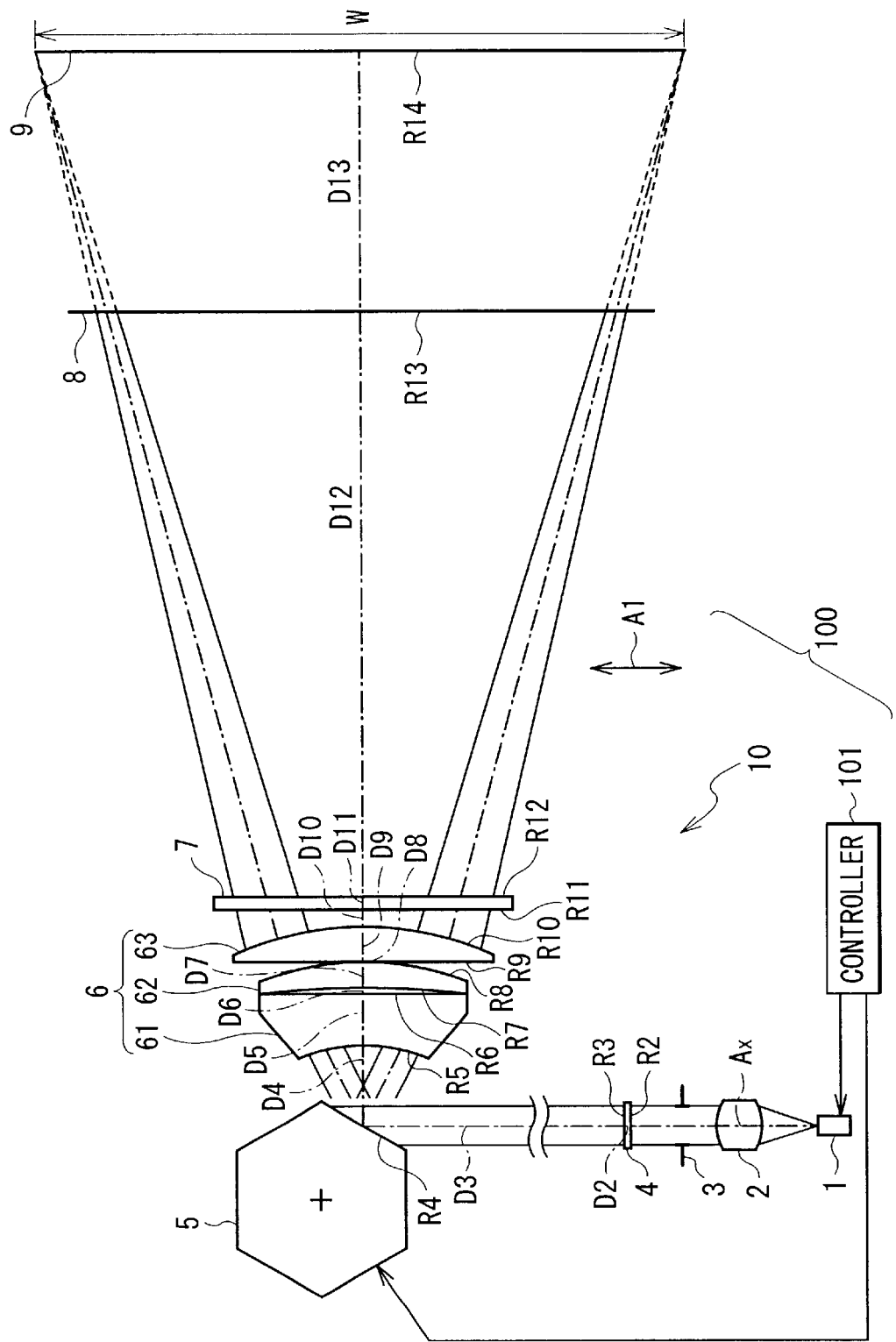
FIG. 1 is a plane view of the structure of an optical system according to an embodiment of the invention.
Figure 2:
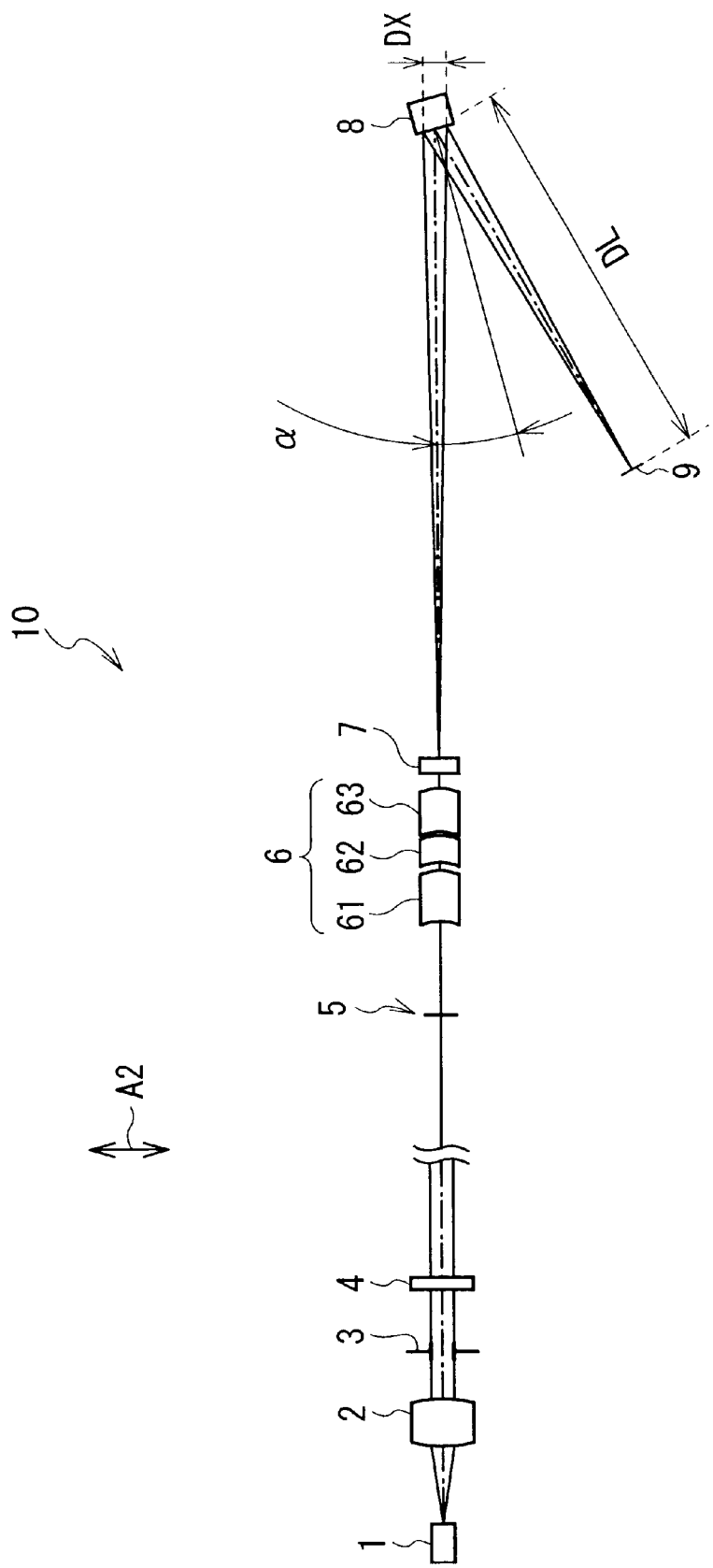
FIG. 2 is a side view of the structure of the optical system according to the embodiment of the invention.
Figure 5A:
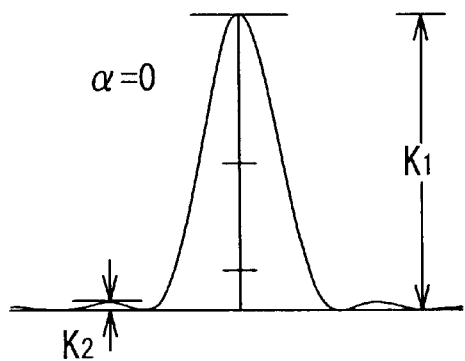
FIG. 5A is a diagram showing a beam intensity distribution on the target surface when the incident angle of the incident light into the cylindrical mirror is 0 degree in example 1 shown in FIGS. 3A to 3C.
Figure 5B:
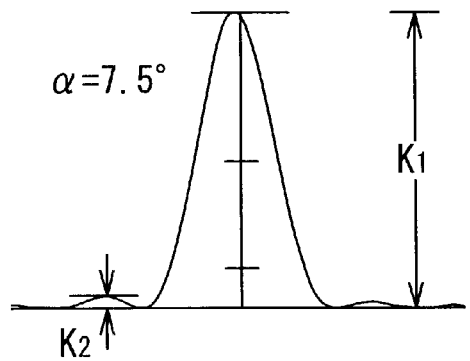
FIG. 5B is a diagram showing a beam intensity distribution on the target surface when the incident angle of the incident light into the cylindrical mirror is 7.5 degrees in example 1 shown in FIGS. 3A to 3C.
Figure 5C:
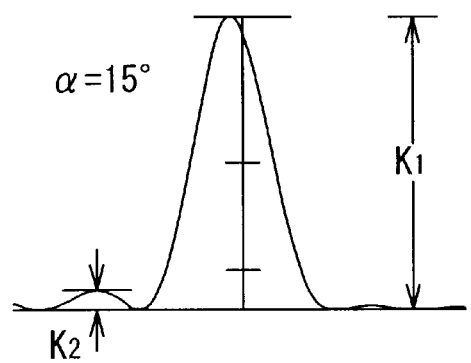
FIG. 5C is a diagram showing a beam intensity distribution on the target surface when the incident angle of the incident light into the cylindrical mirror is 15 degrees in example 1 shown in FIGS. 3A to 3C.
Figure 5D:
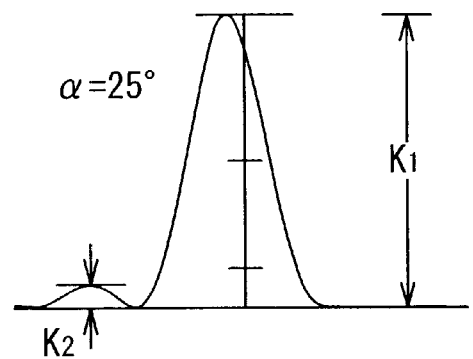
FIG. 5D is a diagram showing a beam intensity distribution on the target surface when the incident angle of the incident light into the cylindrical mirror is 25 degrees in example 1 shown in FIGS. 3A to 3C.

FIGS. 1 and 2 show respectively a plane view and side view of the basic structure of an optical system 10 according to a first embodiment of the invention. The optical system 10, used for devices such as laser beam printers, condenses a beam emitted from a light source 1 (described later) on a surface (referred to as a target surface 9 hereinafter) of an element such as a photo conductor drum to form a beam spot, and allows the beam spot to travel in a certain direction along the surface consisted of a photosensitive material.

The arrow A1 in FIG. 1 represents a direction that the beam spot travels on the target surface 9, which is referred to as a main-scan direction in the following description. The arrow A2 in FIG. 2 represents a direction perpendicular to a direction corresponding to the main-scan direction, which is referred to as a sub-scan direction in the following description. Here, the main-scan direction corresponds to a specific example of a "first scanning direction" of the invention, and the sub-scan direction corresponds to a "second scanning direction" of the invention.

In the optical system 10, as shown in FIG. 2, a cylindrical mirror 8 (described later) reflects the beam so that the reflected light may be focused onto the target surface 9. FIG.

1 shows an optical path from the light source 1 to the cylindrical mirror 8, and an optical path from the cylindrical mirror 8 to the target surface 9 in the same plane for simplification of illustration.

The sign RI (I=2, 3, 4 . . . 14) in FIG. 1 represents a curvature radius of the Ith lens surface counted from an aperture 3 (described later) to the advance direction of the beam, and the sign DI (I=2, 3, . . . 13) represents a distance between the Ith lens surface and the (I+1)th lens surface along the optical axis.

The optical system 10 has the light source 1 which may consist of a semiconductor laser element. The light source 1 emits a beam with a wave length of 780 micrometers for example, a controller 101 described later controls the light emission. A collimator lens 2 is placed on an emission side of the light source 1. The collimator lens 2 is formed in the rotation symmetry with respect to an optical axis Ax, and may be composed of one lens having an aspheric surface or a plurality of spherical lenses. The collimator lens 2 converts the beam of divergent light emitted from the light source 1 into a beam of parallel light.

The aperture 3 is placed on an emission side of the collimator lens 2 (the side opposite to the light source 1). The aperture 3 has an opening of a certain shape through which the beam emitted from the collimator lens 2 passes. A cylindrical lens 4 is disposed on an emission side of the aperture 3 (the side opposite to the collimator lens 2). The cylindrical lens 4 has refractive power (power) only in the sub-scan direction, and condenses the beam of parallel light converted through the collimator lens 2, only in the sub-scan direction near a reflective surface of a polygon mirror 5. Thereby, a long line image can be formed in the corresponding direction to the main-scan direction. Here, the collimator lens 2, the aperture 3 and the cylindrical lens 4 correspond to a specific example of a "first image forming optical system" of the invention.

It should be noticed that the refractive power means the reciprocal of the focal length of a lens or a refraction surface and that the refraction surface may also include a reflective surface such as a mirror.

The polygon mirror 5 is located in an emission side of the cylindrical lens 4 (the side opposite to the aperture 3). The polygon mirror 5 is a hexahedral mirror in which each of six side faces of a hexagonal prism is a reflective surface, and can be rotated and driven by a motor (not shown) at high speed under control of the controller 101. The polygon mirror 5 changes the reflection angle of the beam on the reflective surface by the rotation, which allows the beam spot on the target surface 9 to travel along the main-scan direction. Here, the polygon mirror 5 corresponds to a specific example of a "deflecting means" of the invention.

A fθ-lens 6 is provided in an optical path of the reflective light of the polygon mirror 5. The fθ-lens 6 has refractive power only in the main-scan direction and always allows the beam spot to travel on the target surface 9 at a constant rate being independent of the rotation angle of the polygon mirror 5. The fθ-lens 6 has a first lens component 61 having negative refractive power in the main-scan direction, a second lens component 62 having positive refractive power in the main-scan direction, and a third lens component 63 having positive refractive power in the main-scan direction in order from a side close to a position of the polygon mirror 5.

The first lens component 61, the second lens component 62, and the third lens component 63 are formed so that all faces may have refractive power in the main-scan direction. Particularly, in the present embodiment, all the faces of the first lens component 61, the second lens component 62, and the third lens component 63 have an arc shape in a cross section, the cross section including an optical axis of the second image forming optical system and being parallel to the first scanning direction. Here, the fθ-lens 6 corresponds to a specific example of a "second image forming optical system" of the invention.

A cylindrical lens 7 having negative refractive power only in the sub-scan direction is provided on an emission side of the fθ-lens 6 (the side opposite to the polygon mirror 5). Furthermore, the cylindrical mirror 8 having refractive power only in the sub-scan direction is located on a emission side of the cylindrical lens 7 (the side opposite to the fθ-lens 6). The cylindrical lens 7 and the cylindrical mirror 8 constitute a so-called field tilt correcting optical system which makes a conjugate relation between the reflective surface of the polygon mirror 5 and the target surface 9 in the sub-scan direction in order to correct the tilt of the reflective surface (a so-called field tilt) of the polygon mirror 5.

As shown in FIG. 2, the cylindrical mirror 8 reflects the incident beam passing through the cylindrical lens 7 towards the above-described target surface 9. It should be noticed that the paraxial beam passing on or near the optical axis of the fθ-lens 6 and further through the cylindrical lens 7 enters the cylindrical mirror 8 with the incident angle α of 15 degrees or less in the sub-scan direction.

Furthermore, in the embodiment, the condition shown in the following expression (1) will be satisfied.

$$0.03 < DX/DL < 0.06 \tag{1}$$

in the expression (1), DX is the beam size in the sub-scan direction of the incident light into the cylindrical mirror 8 and DL is the distance between the cylindrical mirror 8 and the target surface 9.

Moreover, in the embodiment, the condition shown in the following expression (2) will be satisfied.

$$F/DY < 25 \tag{2}$$

in the expression (2) F is the focal length of the fθ-lens 6 and DY is the beam size in the main-scan direction of the incident light into the fθ-lens 6.

In addition, in the embodiment, the relationship between the focal length of the fθ-lens 6 and that of each lens components 61–63 will satisfy the conditions shown in the following expressions (3)-(5).

$$0.2 < -F_1/F < 0.35 \tag{3}$$

$$0.6 < F_2/F < 0.9 \tag{4}$$

$$0.3 < F_3/F < 0.7 \tag{5}$$

$F_1$: the focal length of the first lens component 61.
$F_2$: the focal length of the second lens component 62
$F_3$: the focal length of the third lens component 63

The light emission of the light source 1 in the optical system 10 and the rotations of the polygon mirror 5 and a photo conductor drum (not shown) are controlled by the controller 101 such as a computer. Here, a combination of a plurality of optical components constitutes the optical system 10 and a combination of the optical system 10 and the controller 101 constitutes an optical scanning apparatus 100.

<Operation of the Optical System and the Optical Scanning Apparatus>

First, a basic operation of the optical system 10 and the optical scanning apparatus 100 composed as described above will be explained. In the optical scanning apparatus 100, the controller 101 operates an on-off action on the light source 1 of the optical system 10 at high speed and rotates the polygon mirror 5 at a constant rate and furthermore rotates another element such as the photo conductor drum. In the optical system 10, the beam emitted from the light source 1 is converted into the beam of parallel light by the collimator lens 2, passes through the aperture 3 and the cylindrical lens 4, and is focused once in the sub-scan direction near the reflective surface of the polygon mirror 5. The beam is deflected on the reflective surface of the polygon mirror 5, passes through the fθ-lens 6 and the cylindrical lens 7, and enters the cylindrical mirror 8. Further, the beam is reflected by the cylindrical mirror 8 and focused on the target surface 9 to form the beam spot on the target surface 9. With the rotation of the polygon mirror 5, the beam spot travels on the target surface 9 in the main-scan direction to form a scanning line.

Next, characteristic operations of the embodiment will be explained. In the optical system 10 according to the embodiment, the conjugate relation between the reflective surface of the polygon mirror 5 and the target surface 9 can be acquired by means of the cylindrical lens 7 and the cylindrical mirror 8. Such a relation always allows the beam spot to be formed at a fixed position on the target surface in the sub-scan direction independently of the tilt of the reflective surface (the field tilt) of the polygon mirror 5. Thereby, a position deviation of the scanning line resulting from the field tilt of the polygon mirror 5 can be prevented. Moreover, the optical system for correcting the field tilt is formed by combining the cylindrical lens 7 and the cylindrical mirror 8. Therefore the position of a principal point on an image side can be close to the target surface 9 and the curvature of field in the sub-scan direction can be prevented.

Moreover, in the embodiment, the rotation of the polygon mirror 5 allows the beam spot to travel on the target surface 9, and the travel length, i.e. the scanning stroke W, of the beam spot is set to be longer than 500 mm. Thereby, when the optical system 10 is used for a device such as laser beam printers, big size images can be formed.

Furthermore, in the embodiment, the beam passing near the optical axis of the fθ-lens 6 enters the cylindrical mirror 8 with the incident angle α of 15 degrees or less in the sub-scan direction. Here, the setting of the incident angle α to be 15 degrees or less provides the following operations and effects. In the conventional system, when the cylindrical mirror 8 reflects the beam, the coma aberration is generated. The coma aberration allows generation of a spot having the secondary intensity called a side lobe adjoining the original beam spot on the target surface 9. The larger the incident angle α of the incident light to the cylindrical mirror 8 in the sub-scan direction becomes, the higher the coma aberration becomes. In the embodiment, the setting of the incident angle α to be 15 degrees or less can prevent the generation of the coma aberration and can restrain the intensity of the side lobe to be $1/10$ or less of the intensity of the original beam spot. Thus, when the intensity of the side lobe is $1/10$ or less of the intensity of the original beam spot, the existence of the side lobe can become negligible, and an excessive expansion of the beam spot can be prevented.

In addition, in the optical system 10 described above, the beam spot size in the sub-scan direction can be further shortened, as the beam size DX in the sub-scan direction of the incident light into the cylindrical mirror 8 becomes longer. And the cylindrical mirror 8 can be shorter, as the distance DL between the cylindrical mirror 8 and the target surface 9 becomes longer. In the embodiment, since the expression (1) is satisfied, the sufficient minute beam spot for obtaining the expected resolution can be acquired, and the cylindrical mirror 8 can be shorter to an extent that manufacturing can be performed without difficulty.

If DX/DL is 0.06, the upper limit indicated in the expression (1), or more, the cylindrical mirror 8 is required to have a length that has difficulty in processing, which causes a higher manufacturing cost. On the other hand, if DX/DL is 0.03, the lower point indicated in the expression (1), or less, the sufficient minute beam spot for the expected resolution is not obtained and it is difficult to improve the resolution.

Furthermore, in the optical system 10 described above, the beam spot size on the target surface can be shorter, as the beam size DY in the main-scan direction of the incident light into the fθ-lens 6 is longer compared to the focal length F of the fθ-lens 6. In the embodiment, the minute beam spot can be obtained also in the main-scan direction by satisfying the expression (2).

In addition, in the embodiment, the expressions (3)-(5) are satisfied, which can prevent the generation of the spherical aberration and the coma aberration and contribute the proper correction of the curvature of field and distortion aberration in the main-scan direction.

Here, if $-F_1/F$ is 0.35, the upper limit indicated in the expression (3), or more, the curvature of field in the main-scan direction is corrected inadequately. On the other hand, if $-F_1/F$ is 0.2, the lower point indicated in the expression (3), or less, the spherical aberration and the coma aberration occur, and negative distortion aberration becomes excessive.

If $F_2/F$ is 0.9, the maximum indicated in the expression (4), or more, the refracting power of the third lens element 63 becomes too large and the negative distortion aberration becomes excessive. On the other hand, if $F_2/F$ is 0.6, the lower point indicated in the expression (4), or less, the refracting power of the second lens element 62 becomes too large and the negative distortion aberration also become excessive.

If $F_3/F$ is 0.7, the upper limit indicated in the expression (5), or more, the negative distortion aberration is insufficient. On the other hand, if $F_3/F$ is 0.3, the lower point indicated in the expression (5), or less, the curvature of field in the main-scan direction is corrected inadequately.

<Effects of the Embodiment>

As described above, according to the optical system of the embodiment, the generation of the side lobe formed on the target surface 9 can be prevented and the high resolution in the sub-scan direction can be obtained, because the incident angle α in the sub-scan direction of the incident light into the cylindrical mirror 8 is set to be 15 degrees or less. Moreover, the formation of big size images can be achieved, because the scanning stroke W is set to be longer than 500 mm.

Furthermore, since the expression (1) is satisfied, much higher resolution in the sub-scan direction can be obtained, and the manufacturing cost can be reduced due to the shortening of the cylindrical mirror 8.

Moreover, since the expression (2) is satisfied, higher resolution can be obtained in the main-scan direction. Furthermore, the fθ-lens 6 is composed of the three lenses, i.e., the first lens component 61, the second lens component 62 and the third lens component 63, besides the expressions (3)-(5) are satisfied. Therefore, the generation of the spherical aberration and the coma aberration can be prevented, and the curvature of field and the distortion aberration in the main-scan direction can be restrained within the proper range. That is, improvement in the resolution in the main-scan direction can be achieved.

In addition, the deviation of the scanning line position resulting from the field tilt of the polygon mirror 5 can be prevented, because the cylindrical lens 7 and the cylindrical mirror 8 make the conjugate relation between the reflective surface of the polygon mirror 5 and the target surface 9. Moreover, the field tilt correcting optical system is composed of the cylindrical lens 7 and the cylindrical mirror 8, whereby the position of the principal point on the image side can be close to the target surface 9 to prevent the curvature of field in the sub-scan direction.

EXAMPLE 1

Next, with reference to FIGS. 3A to 3C and 4A to 4D, example 1 of the optical system according to the present embodiment will be explained.

FIG. 3A shows concrete data of example 1 of the optical system according to the embodiment. Surface number SI in FIG. 3A represents the order of the lens surface counted from the aperture 3. Curvature radius RI represents the curvature radius in the main-scan direction of the Ith lens surface counted from the aperture 3 as well as the sign RI shown in FIG. 1. Face-to-face distance DI represents the distance between the Ith lens surface SI and the (I+1)th lens surface S(I+1) counted from the aperture 3 along the optical axes as well as the sign DI shown in FIG. 1. The unit of both curvature radius RI and face-to-face distance DI is millimeter (mm). Refractive index represents the value with d-line.

It should be noticed that the incident surface (S2) of the collimator lens 4, the incident surface (S11) of the cylindrical lens 7, and the reflective surface (S13) of the cylindrical mirror 8 have the curvature radius RI not in the main-scan direction but in the sub-scan direction. Therefore, the curvature radius RI in the sub-scan direction is shown in FIG. 3B.

FIG. 3C shows features of the optical system according to the embodiment, that is, the focal length F of the fθ-lens 6, the diameter $\phi_M$ of the opening in the main-scan direction, the diameter $\phi_A$ of the opening in the sub-scan direction and the scanning stroke W. FIG. 3C also shows the ratio $F_1/F$ of the focal length $F_1$ of the first lens component 61 to the focal length F of the fθ-lens 6, the ratio $F_2/F$ of the focal length $F_2$ of the second lens component 62 to the focal length F of the fθ-lens 6, and the ratio $F_3/F$ of the focal length $F_3$ of the third lens component 63 to the focal length F of the fθ-lens 6. Moreover, FIG. 3C shows the ratio DX/DL of the beam size DX in the sub-scan direction of the incident light into the cylindrical mirror 8 to the distance DL between the cylindrical mirror 8 and the target surface 9, and the ratio F/DY of the focal length F of the fθ-lens 6 to the beam size DY in the main-scan direction of the incident light into the fθ-lens 6.

In the optical system of the present example, as shown in FIG. 3C, the incident angle α of the incident light into the cylindrical mirror 8 in the sub-scan direction is 7.5 degrees and less than 15 degrees. The length W of the scanning stroke is 610 mm, which is longer than 500 mm.

Furthermore, the ratio DX/DL of the beam size DX in the sub-scan direction of the incident light into the cylindrical mirror 8 to the distance DL between the cylindrical mirror 8 and the target surface 9 is 0.038 and has satisfied the expression (1). And, the ratio F/DY of the focal length F of the fθ-lens 6 to the beam size DY in the main-scan direction of the incident light into the fθ-lens 6 is 20.4 and has satisfied the expression Moreover, the ratio $F_1/F$ of the focal length $F_1$ of the first lens component 61 to the focal length F of the fθ-lens 6 is −0.299 and has satisfied the expression (3). The ratio $F_2/F$ of the focal length $F_2$ of the second lens component 62 to the focal length F of the fθ-lens 6 is 0.789 and has satisfied the expression (4). The ratio $F_3/F$ of the focal length $F_3$ of the third lens component 63 to the focal length F of the fθ-lens 6 is 0.449 and has satisfied the expression (5).

FIGS. 4A–4D show respectively the spherical aberration, the curvature of field in the main-scan direction, the distortion aberration (distortion), and the curvature of field in the sub-scan direction, in the optical system of the present example. In these figures illustrating the aberration, the sign omega represents a half of the angle of view.

These figures illustrating the aberration show that optimal optical features as an optical system have been obtained in the present example.

FIGS. 5A–5D show an intensity distribution in the sub-scan direction of the beam spot formed on the target surface 9, when the incident angle α in the sub-scan direction of the incident light into the cylindrical mirror 8 is respectively 0 degree, 7.5 degrees, 15 degrees, and 25 degrees in the example. In FIGS. 5A–5D, a horizontal axis represents the position of the sub-scan direction on the target surface 9, and a vertical axis represents the intensity. As shown in FIG. 5 D, when the incident angle α in the sub-scan direction of the incident light into the cylindrical mirror 8 exceeds 15 degrees, intensity $K_2$ of the side lobe becomes larger than 1/10 of intensity $K_1$ of the original beam spot. On the other hand, as shown in FIGS. 5 A-5C, when the incident angle α is 15 degrees or less, the intensity $K_2$ of the side lobe becomes 1/10 or less of the intensity $K_1$ of the original beam spot. That is, it has been found that setting the incident angle α to be 15 degrees or less can prevent the side lobe.

EXAMPLE 2

Next, with reference to FIGS. 6A to 6C and FIG. 7, example 2 of the optical system according to the present embodiment will be explained.

FIG. 6A shows concrete data of example 2 of the optical system according to the embodiment. Each sign of FIG. 6A represents the same meanings of the FIG. 3A. Moreover, FIG. 6B shows the curvature radius in the sub-scan direction of the cylindrical surfaces (S2, S11, S13) like the above-described FIG. 3B.

FIG. 6C shows features of the optical system according to the embodiment, that is, the focal length F of the fθ-lens 6, the diameter $\phi_M$ of the opening in the main-scan direction, the diameter $\phi_A$ of the opening in the sub-scan direction, the scanning stroke W, the ratio DX/DL of the beam size DX in the sub-scan direction of the incident light into the cylindrical mirror 8 to the distance DL between the cylindrical mirror 8 and the target surface 9, the ratio F/DY of the focal length F of the fθ-lens 6 to the beam size DY in the main-scan direction of the incident light into the fθ-lens 6, the ratio $F_1/F$ of the focal length $F_1$ of the first lens component 61 to the focal length F of the fθ-lens 6, the ratio $F_2/F$ of the focal length $F_2$ of the second lens component 62 to the focal length F of the fθlens 6, and the ratio $F_3/F$ of the focal length $F_3$ of the third lens component 63 to the focal length F of the fθ-lens 6.

In the optical system of the example, as shown in FIG. 6C, the incident angle α of the incident light into the cylindrical mirror 8 in the sub-scan direction is 7.5 degrees and less than 15 degrees. The length W of the scanning line is 610 mm, which is longer than 500 mm. The ratio DX/DL of the beam size DX in the sub-scan direction of the incident light into the cylindrical mirror 8 to the distance DL between the cylindrical mirror 8 and the target surface 9 is 0.038 and has satisfied the expression (1). And, the ratio F/DY of the focal length F of the fθ-lens 6 to the beam size DY in the main-scan direction of the incident light into the fθ-lens 6 is 20.4 and has satisfied the expression (2).

Moreover, the ratio $F_1/F$ of the focal length $F_1$ of the first lens component 61 to the focal length F of the fθ-lens 6 is −0.303 and has satisfied the expression (3). The ratio $F_2/F$ of the focal length $F_2$ of the second lens component 62 to the focal length F of the fθ-lens 6 is 0.687 and has satisfied the expression (4). The ratio $F_3/F$ of the focal length $F_3$ of the third lens component 63 to the focal length F of the fθ-lens 6 is 0.497 and has satisfied the expression (5).

FIGS. 7A–7D show respectively the spherical aberration, the curvature of field of the main-scan direction, the distortion aberration, and the curvature of field of the sub-scan direction in the optical system of the example. In these figures illustrating the aberration, the sign omega represents a half of the angle of view.

These figures illustrating the aberration show that optimal optical features as an optical system have been obtained in the example.

While the above embodiment and examples provide a basis for understanding the present invention, the invention is not limited to the above embodiment and examples, and various modifications and variations are possible. For example, the curvature radius R of each lens component, the face-to-face distance D and the refractive index N are not limited to the value shown in the above-mentioned data examples, but can have other values. Moreover, the optical system of the invention can be used not only for a laser beam printer but also for other applications.

As described above, according to the optical system for scanning of the invention, the incident angle in the second scanning direction of the incident light into the cylindrical mirror is set to be equal to or less than 15 degrees. Therefore, the generation of the side lobe can be prevented, and furthermore, the minute beam spot can be obtained in the second scanning direction, which can contribute to improvement in the resolution. In addition, the optical system for scanning of the invention is preferably applicable to big size images, because the scanning stroke is longer than 500 mm. Furthermore, since the expression (1) is satisfied, much higher resolution in the second scanning direction can be obtained and the cylindrical mirror can be shorter to an extent that manufacturing can be performed without difficulty and the processing cost can be reduced due to the shorter cylindrical mirror. That is, the present invention provides the optical system for scanning (the optical scanning apparatus) with the resolution improvement in the second scanning direction and the good application for the formation of big size images.

Moreover, according to the optical system for scanning of another aspect of the invention, the expression (2) is satisfied, therefore the sufficient minute beam spot for the expected resolution in the first scanning direction can be obtained. And, the expressions (3)-(5) are satisfied, therefore the generation of the spherical aberration and the coma aberration can be prevented, and the curvature of field and distortion aberration in the first scanning direction can be restrained within the proper range. That is, the present invention provides the optical system for scanning (or optical scanning apparatus) with the resolution improvements in the first scanning direction.

Obviously many modifications and variations of the present invention are possible in the light of the above teachings. It is therefore to be understood that within the scope of the appended claims the invention may be practiced otherwise than as specifically described.

What is claimed is:

1. An optical system for scanning a predetermined target surface in a first scanning direction, comprising:
    a light source emitting a beam;
    a first image forming optical system for focusing the beam emitted from the light source in a direction perpendicular to a direction corresponding to the first scanning direction, thereby forming an image;
    deflecting means for deflecting a beam come out from the first image forming optical system so that the beam scans the target surface in the first scanning direction;
    a second image forming optical system for focusing the beam deflected by the deflecting means on the target surface and thereby forming an image so that a scanning speed on the target surface is uniform all over a scanning stroke;
    a cylindrical lens, located in an optical path between the second image forming optical system and the target surface, having negative refractive power only in a second scanning direction perpendicular to the first scanning direction; and
    a cylindrical mirror, located in an optical path between the cylindrical lens and the target surface, having refractive power only in the second scanning direction;
    wherein the scanning stroke in the first scanning direction on the target surface is longer than 500 mm;
    an incident angle of a paraxial beam passing through the second image forming optical system and entering the cylindrical mirror is 15 degrees or less in the second scanning direction; and
    a condition shown in expression (1) as follows is satisfied:

$$0.03 < DX/DL < 0.06 \quad (1)$$

in the expression, DX is a beam size in the second scanning direction of the beam entering the cylindrical mirror and DL is a distance between the cylindrical mirror and the target surface.

2. An optical scanning apparatus comprising:
    optical system as claimed in claim 1 and,
    means for controlling at least the light source and the deflecting means of the optical system.

3. An optical system for scanning a predetermined target surface in a first scanning direction, comprising:
    a light source emitting a beam;
    a first image forming optical system for focusing the beam emitted from the light source in a direction perpendicular to a direction corresponding to the first scanning direction, thereby forming an image;
    deflecting means for deflecting a beam come out from the first image forming optical system so that the beam scans the target surface in the first scanning direction;
    a second image forming optical system for focusing the beam deflected by the deflecting means on the target surface and thereby forming an image so that a scanning speed on the target surface is uniform all over a scanning stroke;
    a cylindrical lens, located in an optical path between the second image forming optical system and the target surface, having negative refractive power only in a second scanning direction perpendicular to the first scanning direction; and
    a cylindrical mirror, located in an optical path between the cylindrical lens and the target surface, having refractive power only in the second scanning direction;

wherein the second image forming optical system comprises a first lens component having negative refractive power in the first scanning direction, a second lens component having positive refractive power in the first scanning direction, and a third lens component having positive refractive power in the first scanning direction in order from a side close to the deflecting means, and conditions shown in expressions (2) to (5) as follows are satisfied:

$$F/DY<25 \quad (2)$$

$$0.2<-F_1/F<0.35 \quad (3)$$

$$0.6<F_2/F<0.9 \quad (4)$$

$$0.3<F_3/F<0.7 \quad (5)$$

in the expressions, DY is a beam size in the first scanning direction of the beam entering to the second image forming optical system;

F is a focal length of the second image forming optical system;

$F_1$ is a focal length of the first lens component;

$F_2$ is a focal length of the second lens component; and $F_3$ is a focal length of the third lens component.

4. An optical system according to claim 3, wherein every optical surface of the first lens component, the second lens component, and the third lens component of the second image forming optical system has a refractive power at least in the first scanning direction.

5. An optical system according to claim 4, wherein every optical surface of the first lens component, the second lens component, and the third lens component of the second image forming system has an arc shape at least in a cross section, the cross section including an optical axis of the second image forming optical system and being parallel to the first scanning direction.

6. An optical scanning apparatus comprising:
optical system as claimed in claim 3 and,
means for controlling at least the light source and the deflecting means of the optical system.

* * * * *